(12) United States Patent
Pickett

(10) Patent No.: US 11,273,944 B2
(45) Date of Patent: Mar. 15, 2022

(54) ADAPTIVE CONTAINER LOADING ASSEMBLY

(71) Applicant: JLS Automation, York, PA (US)

(72) Inventor: Gary Pickett, Indian Trail, NC (US)

(73) Assignee: JLS Automation, York, PA (US)

( * ) Notice: Subject to any disclaimer, the term of this patent is extended or adjusted under 35 U.S.C. 154(b) by 264 days.

(21) Appl. No.: 16/554,855

(22) Filed: Aug. 29, 2019

(65) Prior Publication Data
US 2021/0061506 A1 Mar. 4, 2021

(51) Int. Cl.
| | |
|---|---|
| *B65B 59/00* | (2006.01) |
| *B65B 43/42* | (2006.01) |
| *B65G 54/02* | (2006.01) |
| *B65B 5/10* | (2006.01) |
| *B65B 5/02* | (2006.01) |
| *B65B 43/10* | (2006.01) |
| *B65G 47/90* | (2006.01) |
| *B65B 35/10* | (2006.01) |
| *B65B 59/02* | (2006.01) |
| *B65B 43/08* | (2006.01) |

(52) U.S. Cl.
CPC .......... *B65B 59/003* (2019.05); *B65B 5/024* (2013.01); *B65B 5/105* (2013.01); *B65B 43/42* (2013.01); *B65G 54/02* (2013.01); *B65B 35/10* (2013.01); *B65B 43/08* (2013.01); *B65B 43/10* (2013.01); *B65B 59/001* (2019.05); *B65B 59/02* (2013.01); *B65B 2210/04* (2013.01); *B65G 47/90* (2013.01)

(58) Field of Classification Search
CPC ........ B65G 47/90; B65G 54/02; B65B 5/024; B65B 5/105; B65B 5/08; B65B 59/001; B65B 59/003; B65B 59/005; B65B 59/02; B65B 43/42; B65B 43/52; B65B 43/56; B65B 57/04
See application file for complete search history.

(56) References Cited

U.S. PATENT DOCUMENTS

| | | | |
|---|---|---|---|
| 5,177,930 A | 1/1993 | Harston et al. | |
| 6,876,107 B2 * | 4/2005 | Jacobs | H02K 11/215 310/12.19 |
| 6,876,896 B1 * | 4/2005 | Ortiz | B29C 66/8351 700/112 |
| 8,074,578 B2 | 12/2011 | Thornton | |

(Continued)

FOREIGN PATENT DOCUMENTS

EP 2865602 A1 * 4/2015 ........... B65B 59/005

*Primary Examiner* — Joshua G Kotis
(74) *Attorney, Agent, or Firm* — Barley Snyder

(57) ABSTRACT

An adaptive container loading assembly is provided and includes a container forming assembly, a container shuttle assembly, and a product transport assembly. The container forming provides a plurality of varying sized containers. The container shuttle assembly is positioned adjacent to the container forming assembly and includes a linear synchronous motor guideway shaped in an endless loop, and a plurality of transport vehicles moveable about the guideway, each transport vehicle a leading shuttle and a trailing shuttle spaced apart by a determined distance to accommodate and receive the plurality of varying sized containers. The product transport assembly is positioned adjacent the container shuttle assembly and includes a robot arm to position product in the plurality of varying sized containers.

17 Claims, 16 Drawing Sheets

(56) References Cited

U.S. PATENT DOCUMENTS

| | | | |
|---|---|---|---|
| 8,827,071 B2* | 9/2014 | van de Loecht | B65G 17/12 |
| | | | 198/805 |
| 8,863,669 B2 | 10/2014 | Young et al. | |
| 9,309,017 B2* | 4/2016 | Langen | B65B 43/52 |
| 9,604,795 B2* | 3/2017 | Aumann | B65G 54/02 |
| 9,731,854 B2* | 8/2017 | Mann | B65B 57/14 |
| 9,856,096 B2* | 1/2018 | Hanisch | B65G 54/02 |
| 10,035,663 B2* | 7/2018 | Ford | B65B 11/004 |
| 10,569,974 B2* | 2/2020 | Neubauer | B65G 54/02 |
| 10,974,914 B2* | 4/2021 | Kleinikkink | H02K 41/02 |
| 2015/0158611 A1* | 6/2015 | Kalany | B65B 5/06 |
| | | | 53/443 |
| 2016/0207658 A1* | 7/2016 | Bellante | B65B 51/02 |

* cited by examiner

ADAPTIVE CONTAINER LOADING ASSEMBLY

FIELD OF THE INVENTION

The invention relates to a container loading assembly and, more particularly, to an adaptive container loading assembly for loading varying sized containers using a container shuttle assembly.

BACKGROUND

Product packaging for food provides protection, tampering resistance, and product information of processed food before it is delivered to the consumer.

A container, which is typically used for packaging, is generally made of chip board or paper board, but is not limited to these materials. Examples of this type of container are cereal boxes, boxes of snack cakes, and boxes containing a frozen food meal. These containers are usually made by a container forming machine that produces one or more sized containers that are either stored or and then sent downstream to be loaded.

There are many known techniques for loading containers for food packaging including the following two main packaging methods for cartoning: (1) load the product into the container through the side or end of the container, and (2) load the product through the top of the container. These containers are usually made by a machine producing one size at a time that is either stored or and then sent downstream to be packaged by a loading assembly that loads product into the container. However, known loading assemblies are fit to handle one sized container at a time. There is a need to efficiently load varying size containers using a unitary assembly without downtime to adjust the machine performing loading of the containers.

SUMMARY

An adaptive container loading assembly is provided and includes a container forming assembly, a container shuttle assembly, and a product transport assembly. The container forming provides a plurality of varying sized containers. The container shuttle assembly is positioned adjacent to the container forming assembly and includes a linear synchronous motor guideway shaped in an endless loop, and a plurality of transport vehicles movable about the guideway, each transport vehicle a leading shuttle and a trailing shuttle spaced apart by a determined distance to accommodate and receive the plurality of varying sized containers. The product transport assembly is positioned adjacent the container shuttle assembly and includes a robot arm to position product in the plurality of varying sized containers.

BRIEF DESCRIPTION OF THE DRAWINGS

The invention will now be described by way of example with reference to the accompanying figures, of which.

DETAILED DESCRIPTION OF THE EMBODIMENT(S)

Figure 1:
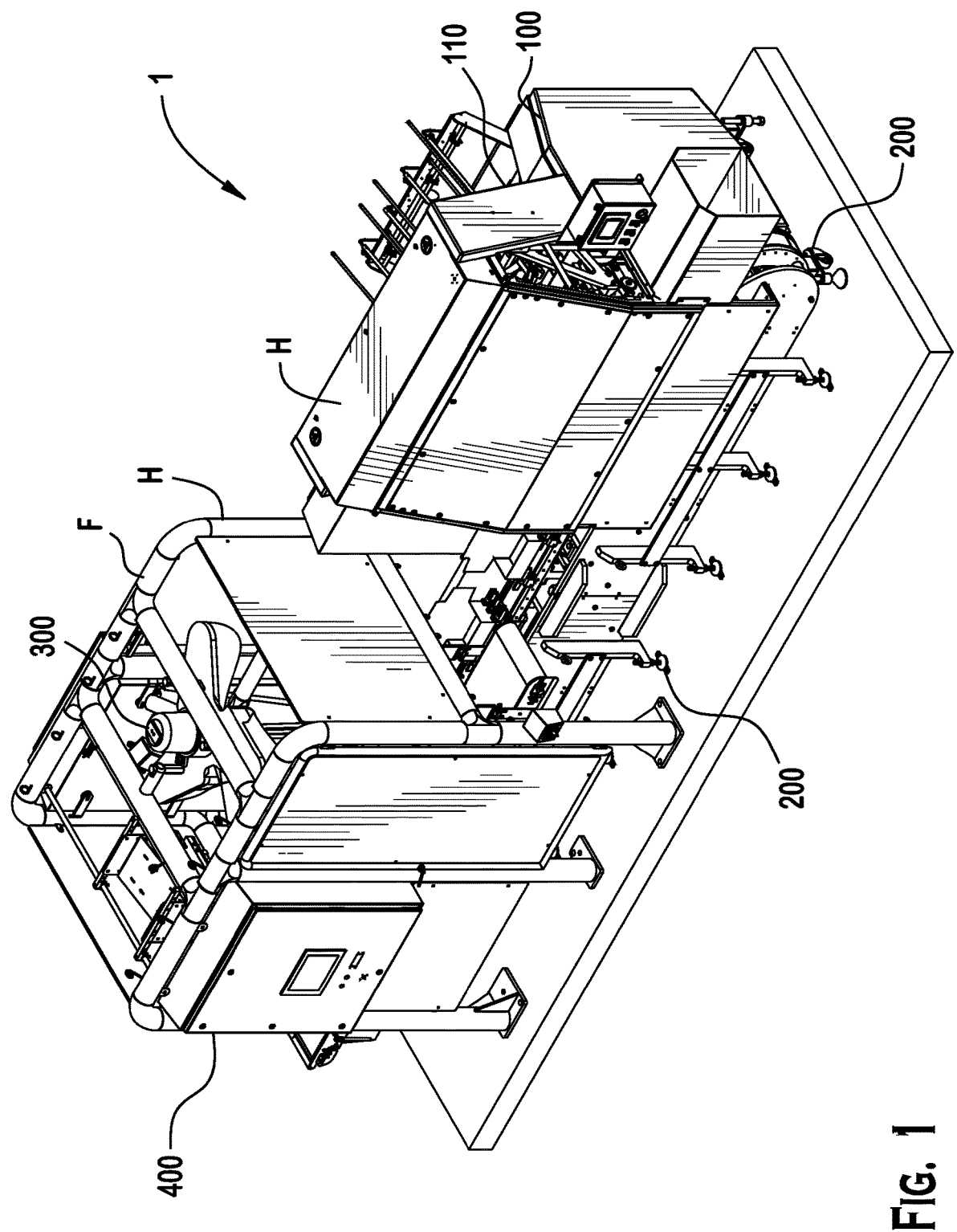
FIG. 1 is a perspective view of a container loading assembly according to the invention.
Figure 2:
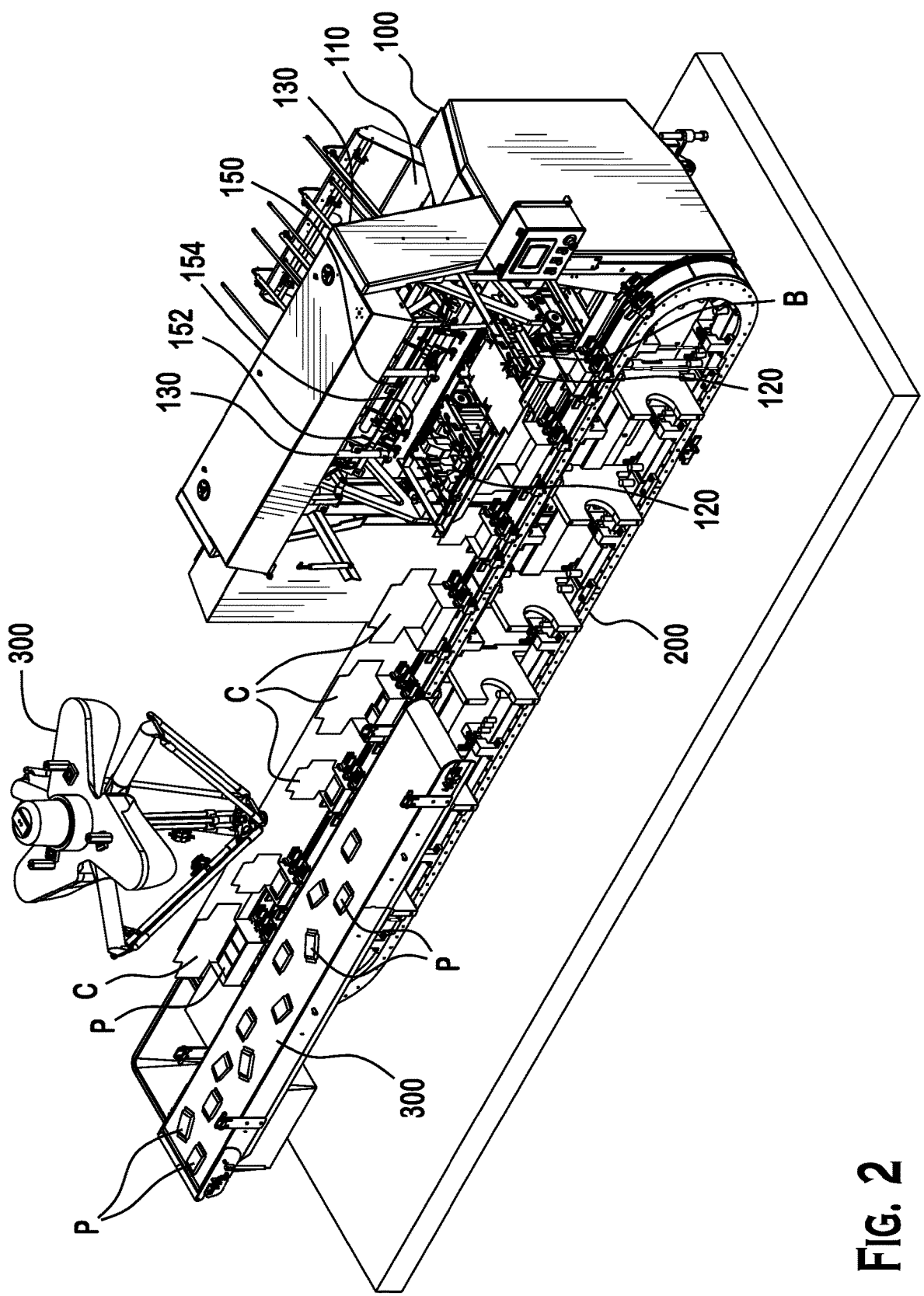
FIG. 2 is a front partial perspective of the container loading assembly of FIG. 1, showing the major components thereof without protective housing and structural supports detailed in FIG. 1.
Figure 3:
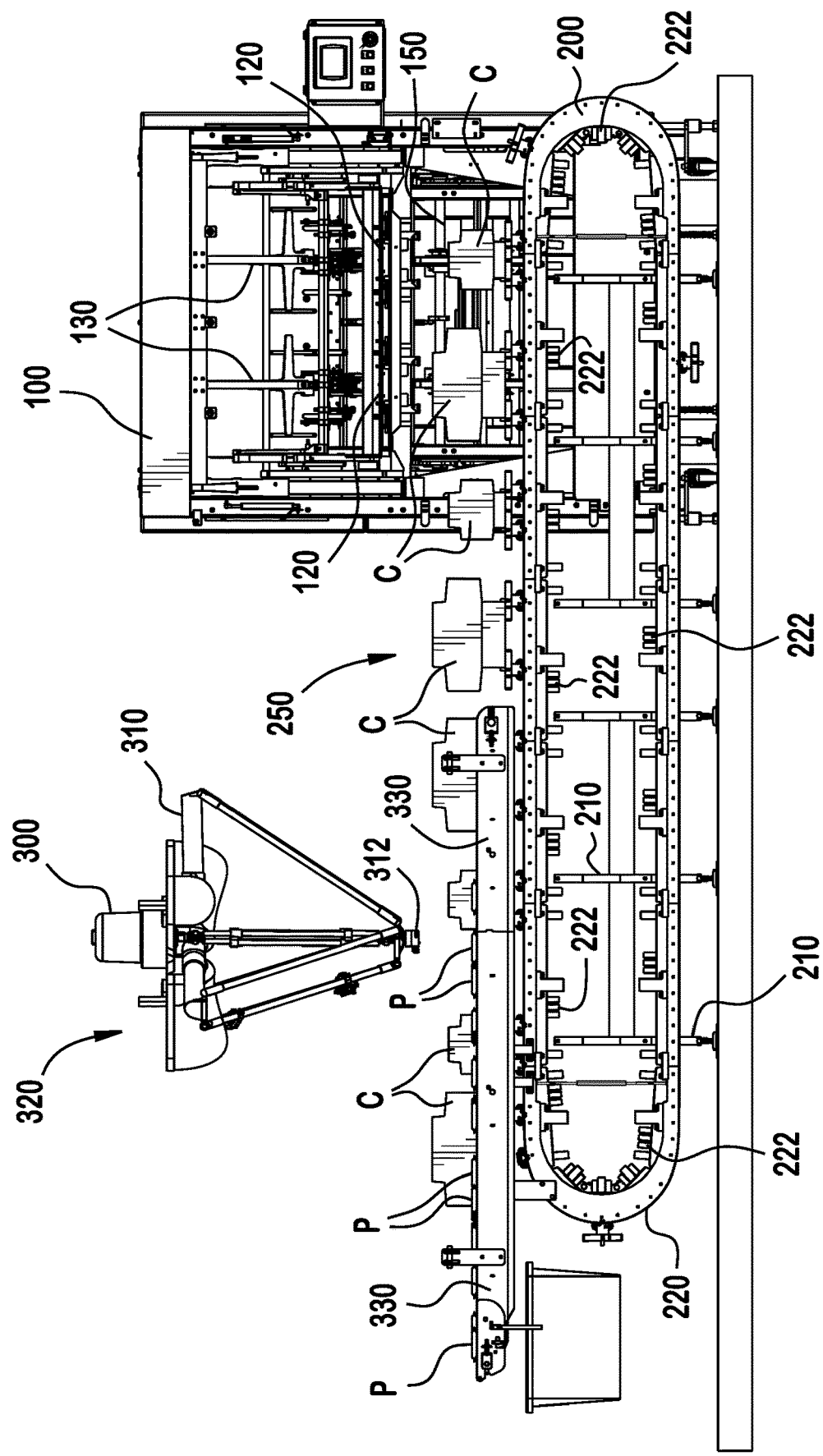
FIG. 3 is a front view of the container loading assembly of FIG. 2.
Figure 4:
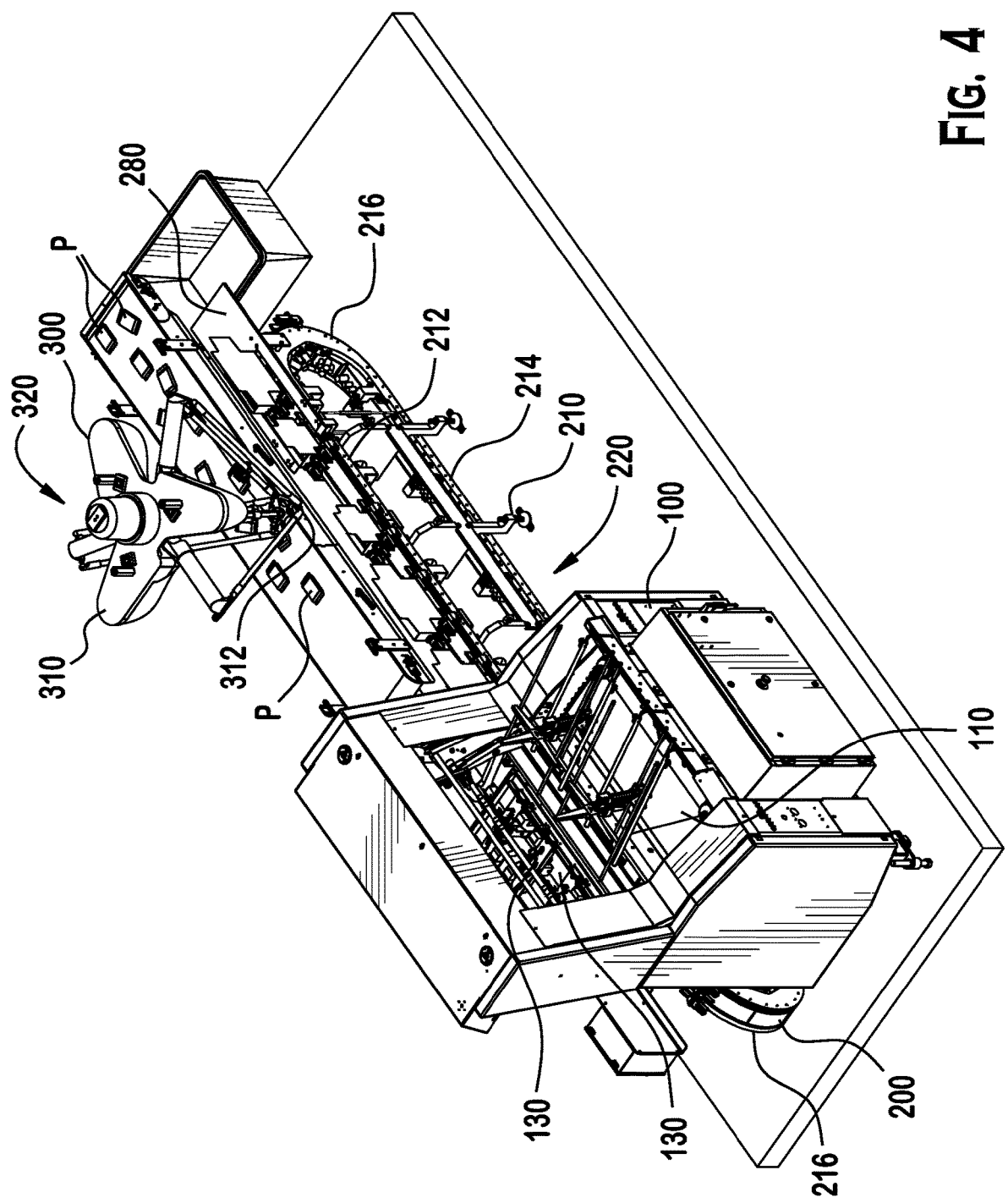
FIG. 4 is a rear perspective view of the container loading assembly of FIG. 2.
Figure 5:
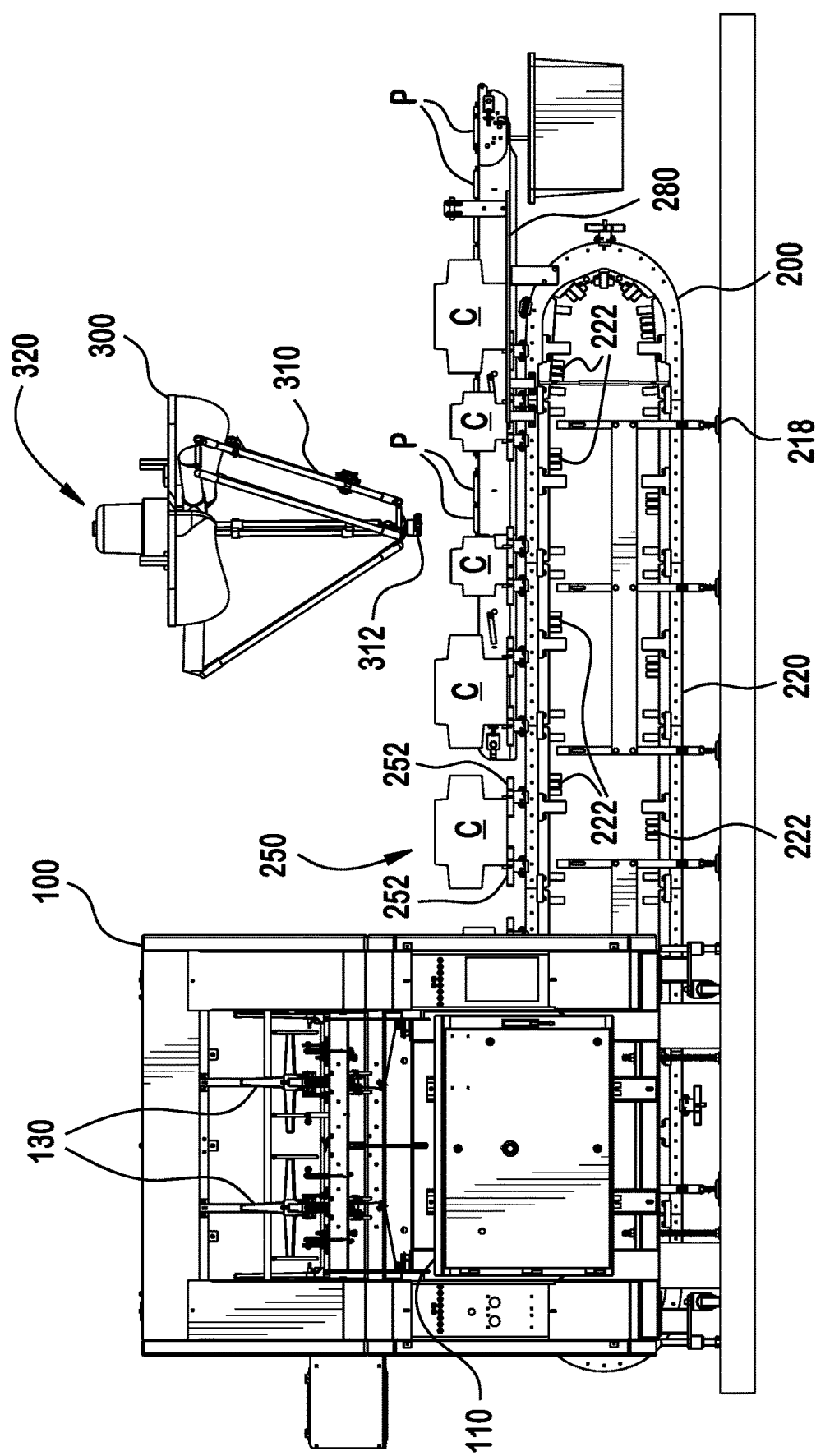
FIG. 5 is a rear view of the container loading assembly of FIG. 2.

Exemplary embodiments of the present invention will be described hereinafter in detail with reference to the attached drawings, wherein like reference numerals refer to like elements. The present invention may, however, be embodied in many different forms and should not be construed as being limited to the embodiments set forth herein; rather, these embodiments are provided so that the present disclosure will be thorough and complete, and will fully convey the concept of the disclosure to those skilled in the art.

Now with reference to the figures, an adaptive container packaging assembly 1 ("container packaging assembly 1") according to the invention is shown.

As shown in FIGS. 1-5, the container packaging assembly 1 according to the invention generally includes a container forming assembly 100, a container shuttle assembly 200, a product transport assembly 300, and a positioning management system 400. For purposes of detail and clarity, FIG. 2-16 do not include the protective housing (H) and structural supports (S) shown in FIG. 1, in order to view the following major components of the present invention. One skilled in the art should appreciate that the protective housing (H) and structural supports (S) are used known to the art and are used to generally protect and structurally support the major components the present invention.

With reference to FIGS. 1-5, a container forming assembly 100 according to the invention is provided and is an apparatus for forming paperboard containers from flat blanks. Container blanks (B) are fed from a magazine 110 to the face of a forming die 120, a reciprocating plunger 130 is provided to push the blank through the die 120 forming the container C.

For purposes of enablement, this description will focus on use of a paper carton as a container C. However, one skilled in the art should appreciate that any container can be used with the container packaging assembly 1 within the spirit of the invention. This would be any known container to hold product to be packaged, including boxes, cans, cartons, totes, cases, etc.

The container forming assembly 100 of the shown embodiment may be constructed in the manner of a container forming apparatus known in the art—as adapted in accord with the teachings hereof—and, more particularly, for example, in the manner of the container forming apparatus described and shown in U.S. Pat. No. 5,177,930, the teachings of which is incorporated by reference herein, including by way of non-limiting example, in the manner of the forming containers disclosed in of this publications—again, as adapted in accord with the teachings hereof.

In the shown embodiment, the container forming assembly 100 includes varying sized dies 120 and plungers 130. As shown, each die 120 and corresponding plunger 130 is sized to make a specific sized and shaped container C. The magazine 110 holds varying sized blanks to match the varying sized dies 120 and plungers 130. Accordingly, the container forming assembly 100 can make varying sized containers C on demand. For instance, the container forming assembly 100 is capable of making sequential large and small containers, in sequence of alternating sizes. In the alternative, the container forming assembly 100 can produce only one sized container C, for a selected sequence, and then produce another second sized container C intermittently between sequences of the first sized container C.

In the shown embodiment, the container forming assembly 100 further includes container transport mechanism 150 having a plurality of catch arm 152 with an end effector 154.

Each catch arm 152 is mechanical articulating or rotating member with the end effector 154 fixed to an end of the catch arm 152 and is capable of directly interfacing with the container C formed from one of the forming dies 120. The end effector 154 is used to secure the container C to the catch arm 152 in a fixed orientation. In the shown embodiment, the end effector 154 is a suction. The end effector 154 could alternatively be fingers grasping the container, pins penetrating the container, a device attaching to the container by adhesion, or any other type of end effector known to those with ordinary skill in the art.

As shown, the catch arm 152 is positioned below one of the forming dies 120 and can move to position the end effector 154 to grasp the container C from the bottom of the die 120. The catch arm 152 then positions the container C over the a container shuttle assembly 200, Now with reference to FIGS. 6-10, a container shuttle assembly 200 according to the invention is shown. In an exemplary embodiment of the invention, the container shuttle assembly 200 is provided and generally includes a frame assembly 210, a linear synchronous motor (LSM) guideway 220 ("guideway 220"), a plurality of transport vehicles 250, and an unloading assembly 280.

Figure 6:
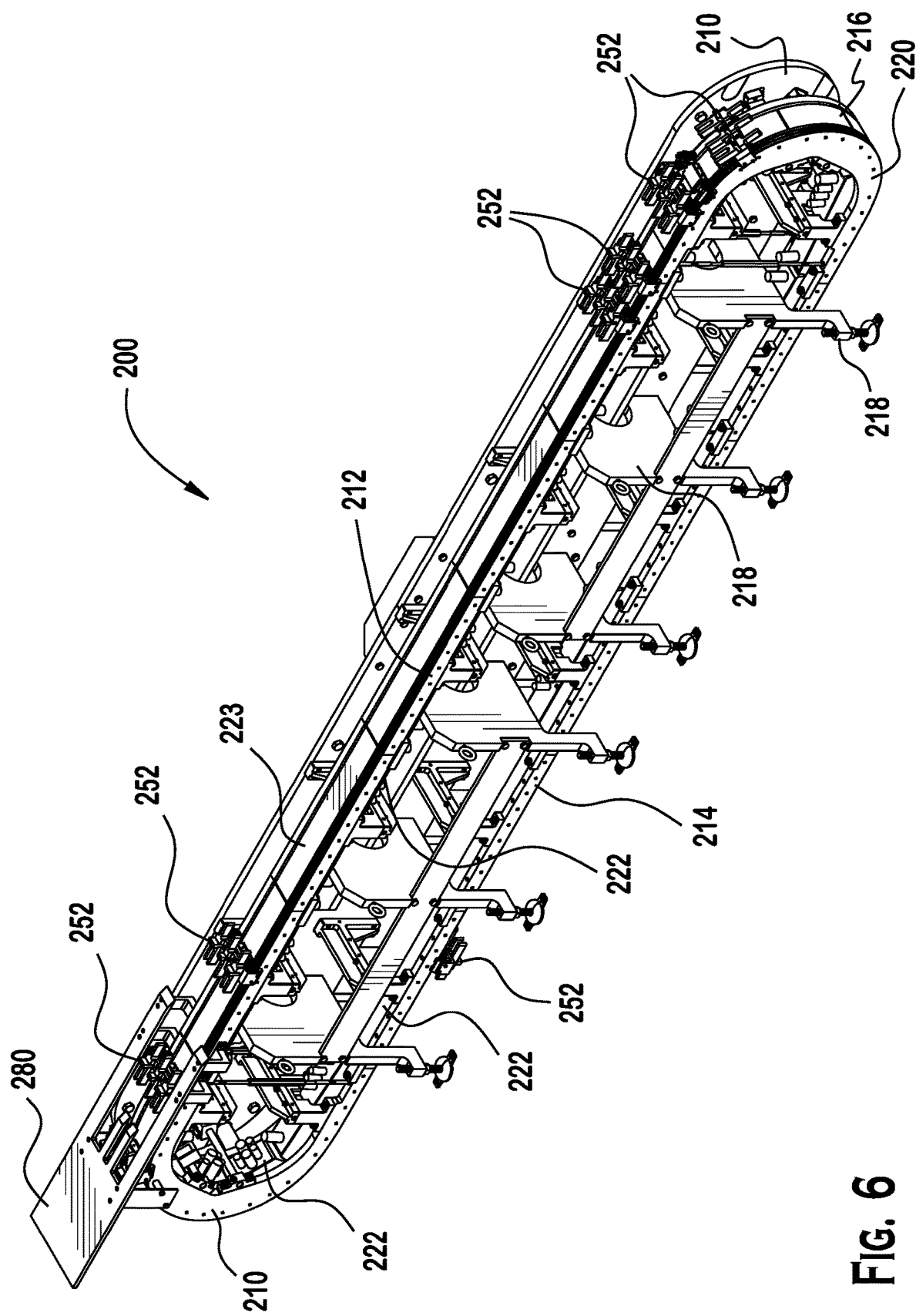
FIG. 6 is a perspective view of a container shuttle assembly according to the invention.
Figure 7:
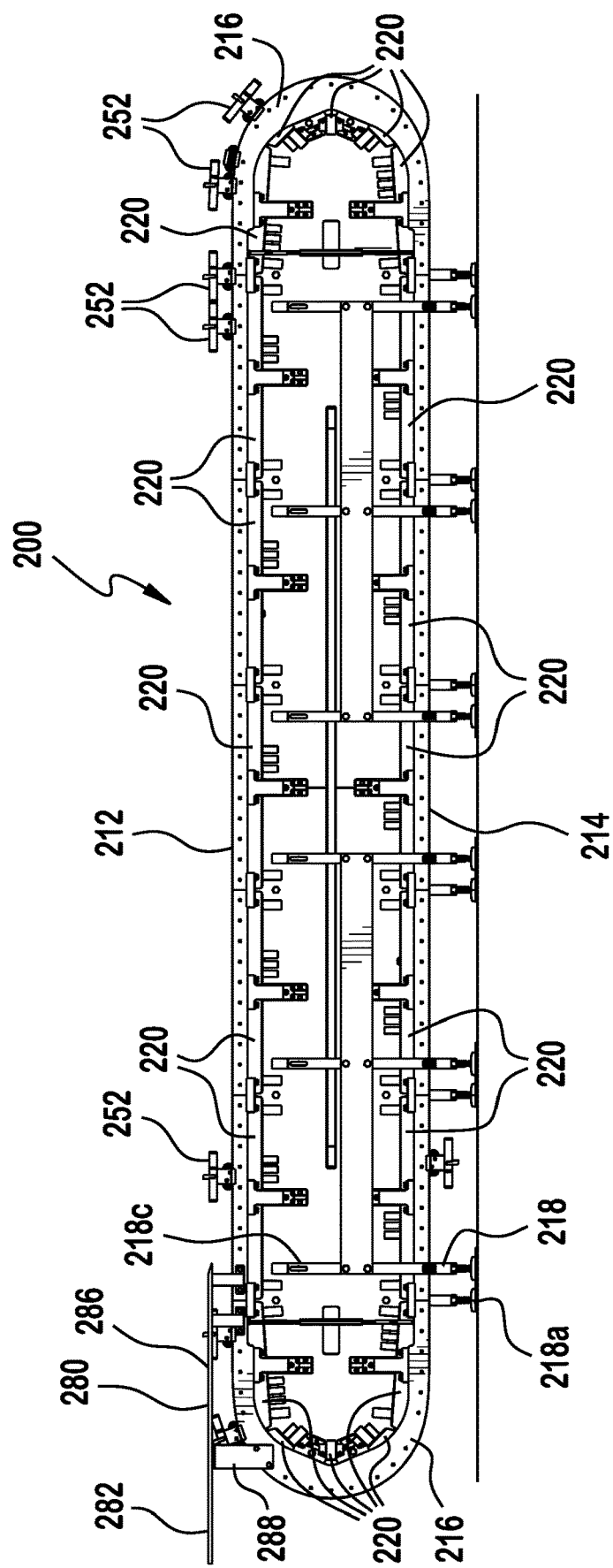
FIG. 7 is a front view of the container shuttle assembly of FIG. 6.

In an exemplary embodiment, a frame assembly 210 according to the invention is shown in FIGS. 6 and 7. The frame assembly 210 generally includes top walls 212, bottom walls 214, side walls 216, and a plurality of support pieces 218.

In the shown embodiment, the frame assembly 210 generally includes a pair of top walls 212 positioned apart and running parallel to each other. Each top wall 212 is a plate like member made from a rigid material, such as aluminum. Likewise, the frame assembly 210 generally includes a pair of bottom walls 214 positioned apart and running parallel to each other. Each bottom wall 214 is a plate like member made from a rigid material, such as aluminum. The top walls 212 are spaced apart from and run parallel to the bottom walls 214.

As shown in FIGS. 6 and 7, each end of the frame assembly 210 includes a pair of side walls 216. In the shown embodiment, each side wall 216 is a plate like member having a C shape (see also FIG. 8). Each pair of side walls 216 are spaced apart from each other and correspond to the top walls 212 and bottom walls 214.

The frame assembly 210 also includes a plurality of support pieces 218 to support the top walls 212, bottom walls 214, and side walls 216 in position and secure them with respect to each other. In the embodiment shown, the top walls 212, bottom walls 214, side walls 216 are positioned to correspond with an oval shape frame or endless loop. In an exemplary embodiment of the invention, the frame assembly 210, more specifically, includes a plurality of floor support pieces 218a, a plurality of wall support pieces 218b, and support brackets 218c.

Figure 8:
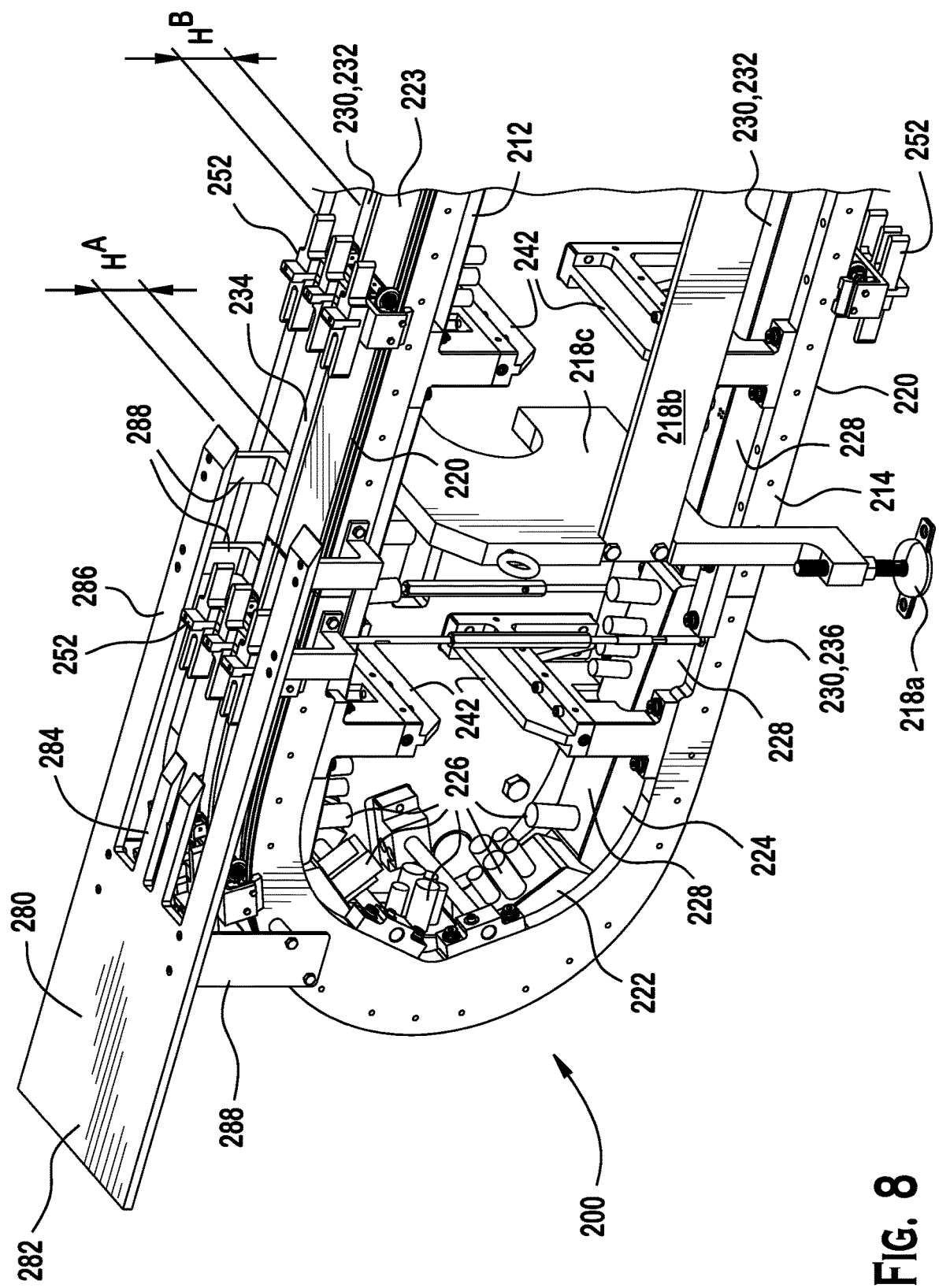
FIG. 8 is a close-up perspective view of the container shuttle assembly of FIG. 6.

Now with reference to FIGS. 6-8, an exemplary embodiment of the guideway 220 is shown and generally includes a plurality of drive modules 222, a plurality of guide rails 230, and plurality of guide rail brackets 242.

In an exemplary embodiment, the guideway 220 is a vehicle transport system using a plurality linear synchronous motor (LSM) stators using power to provide a linear force along its length thereof. As shown, the guideway 220 is arranged as a continuous loop with ends creating an oval shaped configuration. The guideway 220 may be of unitary construction, though, as shown in an exemplary embodiment of invention, the guideway 220 is fabricated from a plurality of drive modules 222.

Each drive module 222 is a long-stator linear motor section and generally includes a housing 224 enclosing a plurality of propulsion coils 226, as well as position sensing logic (sensors), power electronic components, and microprocessors 228 that serve as controllers for individual drive modules 222. The housing 224 includes a low friction guide surface 223 positioned on a top thereof.

Each drive module 222 may be constructed in the manner of LSM stators known in the art—as adapted in accord with the teachings hereof—and generally in the manner of the guideway described and shown in incorporated-by-reference U.S. Pat. Nos. 8,074,578 and 8,863,669—and as adapted in accord with the teachings here below.

In the shown embodiment, each drive module 222 is positioned in and secured to the frame assembly 210 in a continuous loop, an oval shaped arrangement, as shown.

Figure 9:
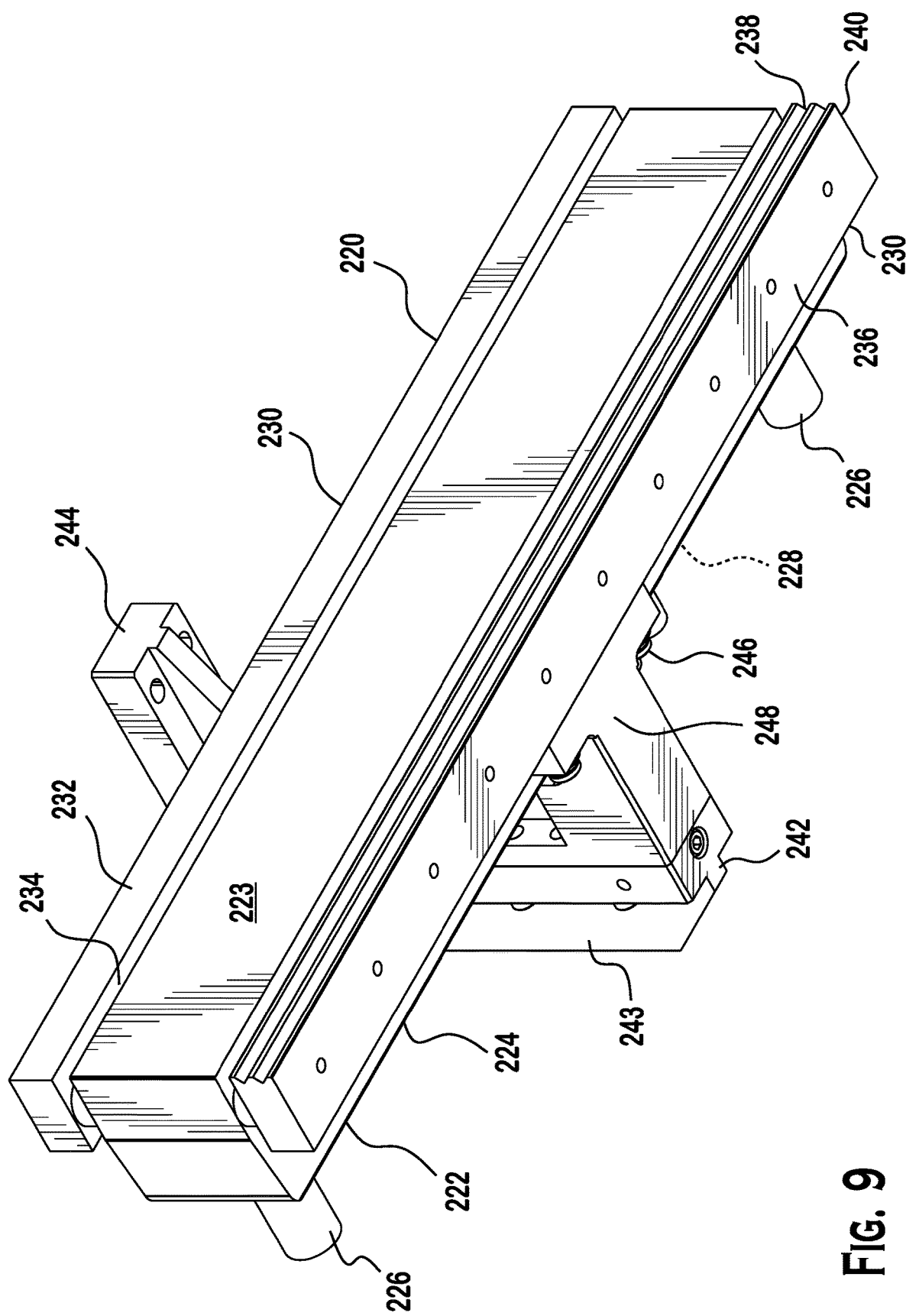
FIG. 9 is a close-up front perspective view of a guideway of container shuttle assembly of FIG. 6.
Figure 10:
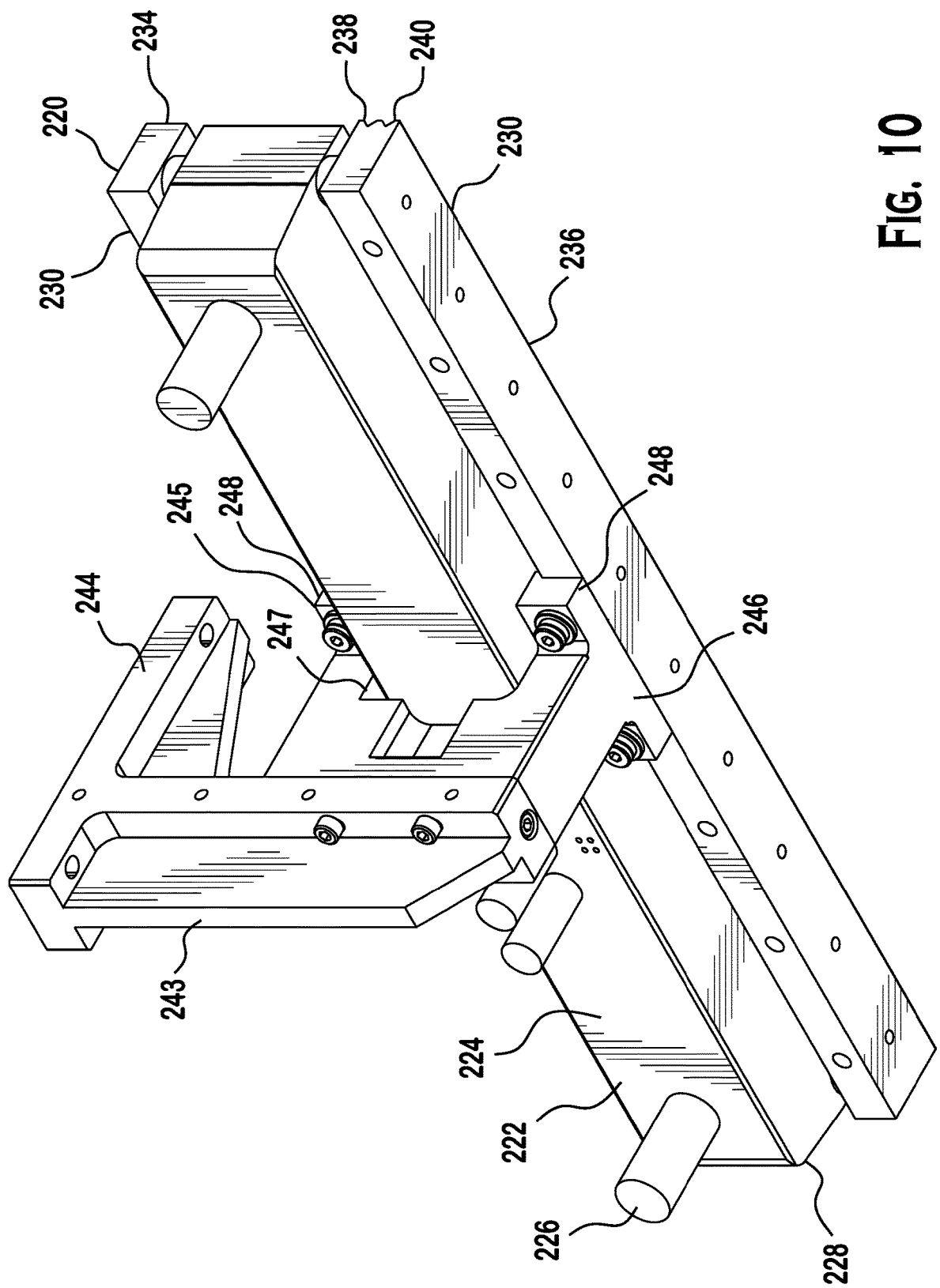
FIG. 10 is a close-up rear perspective view of a guideway of container shuttle assembly of FIG. 6.
Figure 11:
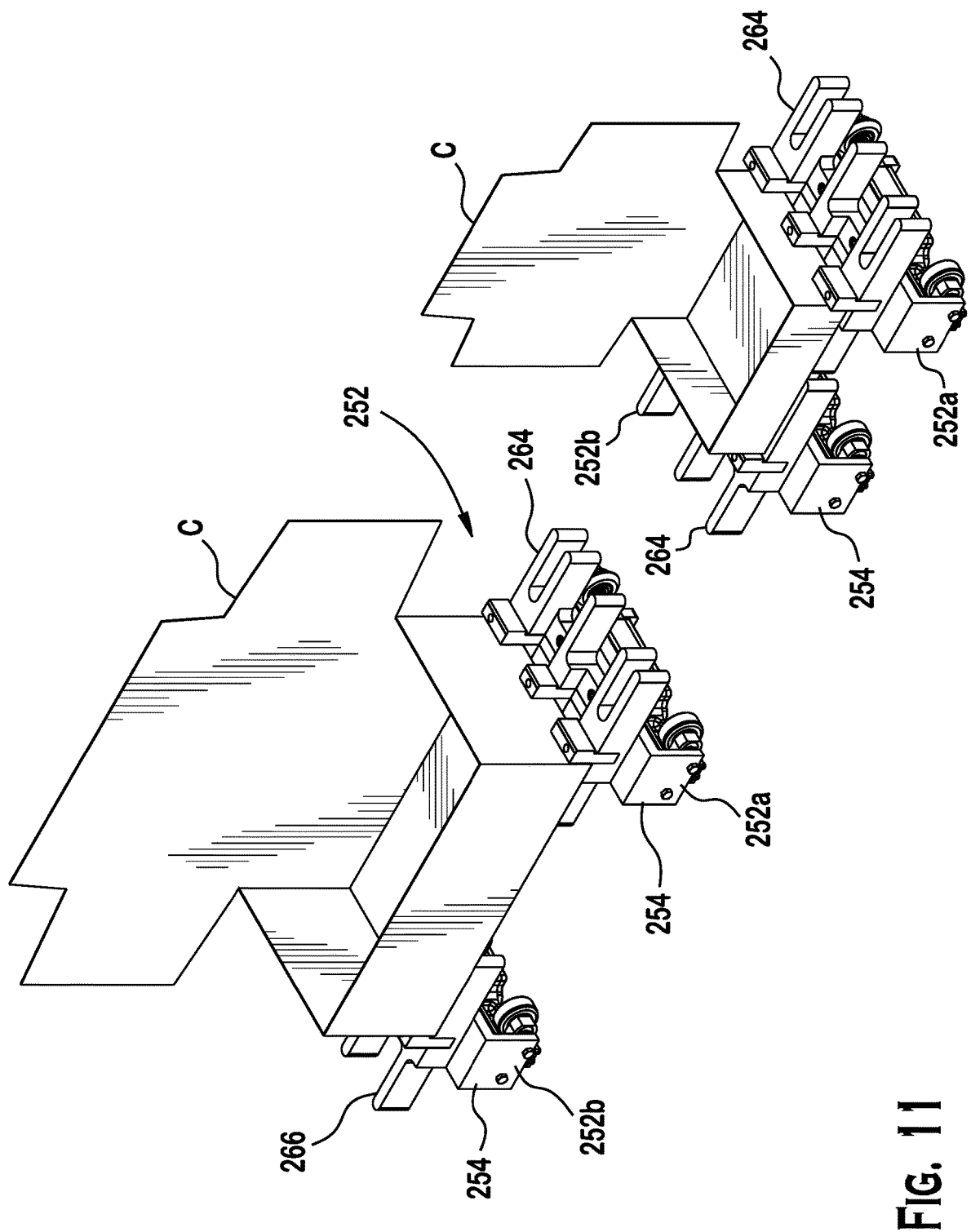
FIG. 11 is a perspective view of a plurality of transport vehicles of a container shuttle assembly according to the invention.
Figure 12:
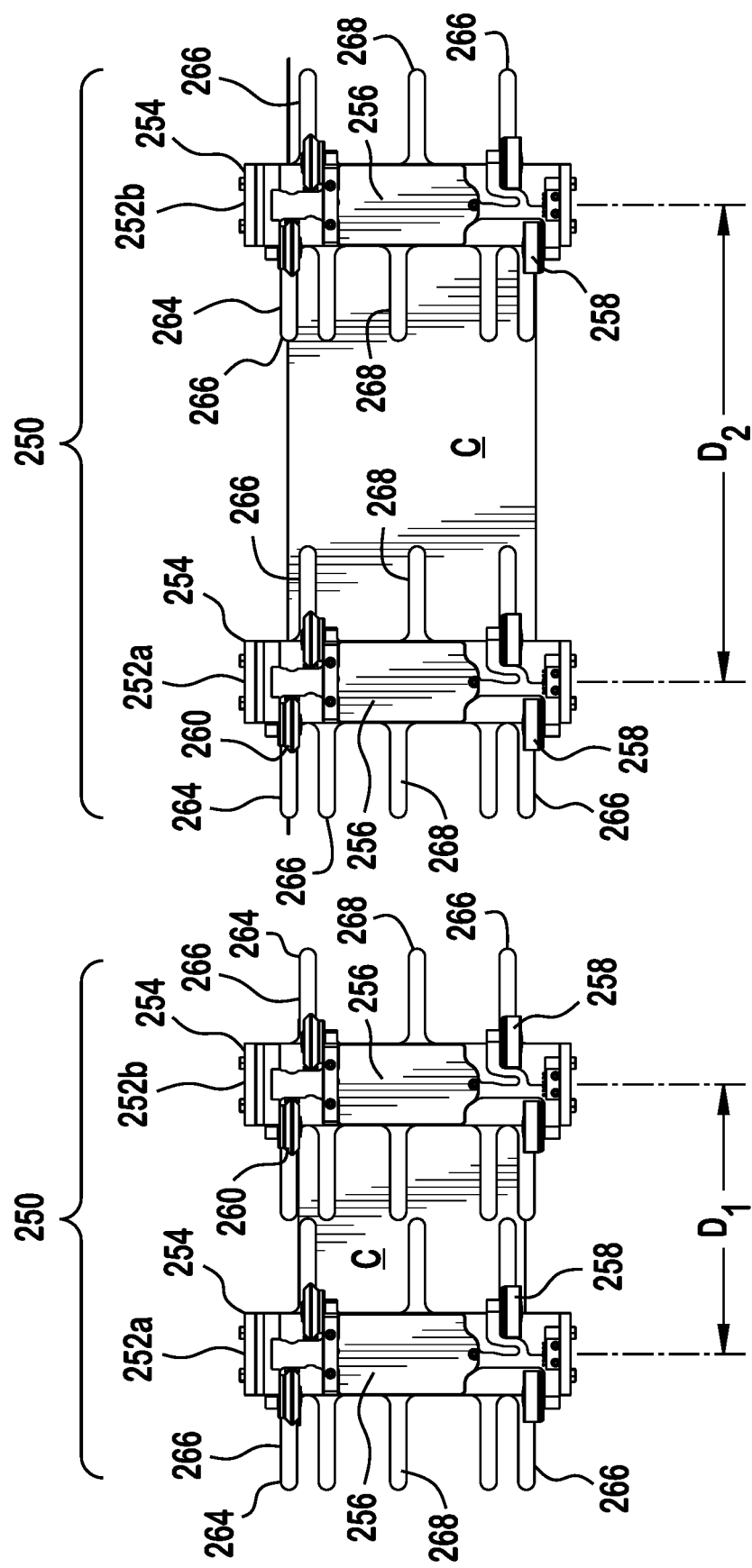
FIG. 12 is a bottom view of the plurality of transport vehicles of FIG. 11.
Figure 13:
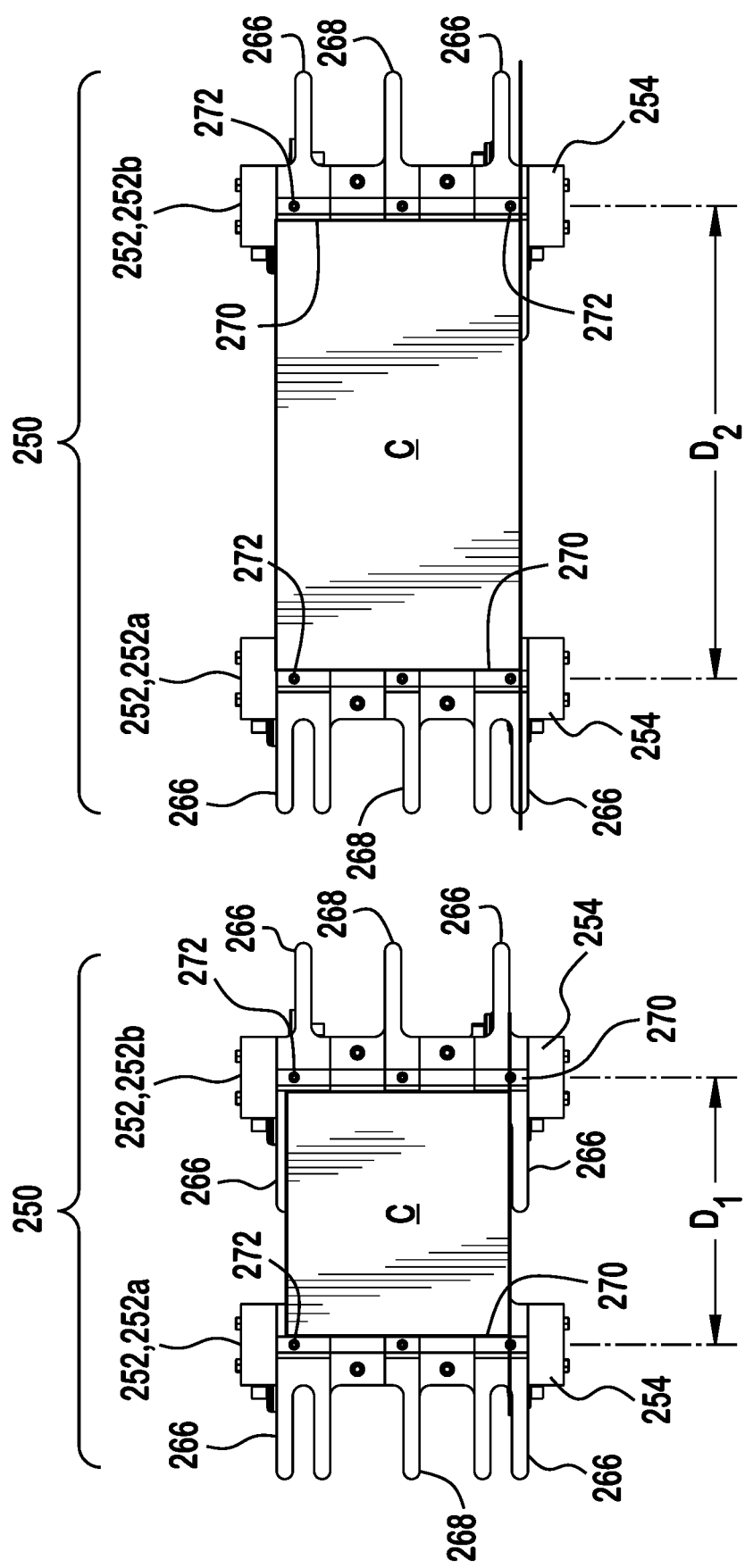
FIG. 13 is a top view of the plurality of transport vehicles of FIG. 11.

With reference to FIGS. 9 and 10, the plurality of guide rails 230 are shown and secured to outer surfaces of the drive modules 222. In the shown embodiment, each guide rail 230 is an elongated rectangular member extending along and secured to an outer surfaces of teach drive module 222. As shown, the guide rail 230 follow the shape of the frame assembly 210 and each drive module 222.

In an exemplary embodiment of the invention, the guide rails 230 generally include a first guide rail 232 positioned on one side of the drive module 222 and a second guide rail 236 positioned on an opposite side of the drive module 222. Each guide rail 230 is positioned such that a top surface is substantially planar with the low friction guide surface 223 of the drive module 222.

More specifically, the first guide rail 232 is an elongated rectangular shaped member having a planar top surface 234 that is positioned substantially planar with the low friction guide surface 223 of the drive module 222. The second guide rail 236 is generally an elongated rectangular shaped member running parallel to the first guide rail 232. However, in contrast, the second guide rail 236 includes a pair grooves (an inner guide groove 238 and an outer guide groove 240) positioned on a top surface thereof. The inner guide groove 238 and the outer guide groove 240 are positioned substantially planar with the low friction guide surface 223 of the drive module 222 and run parallel to each other. The inner guide groove 238 and the outer guide groove 240 are identical v-shaped grooves in the shown embodiment. However, one skilled in the art would appreciate that the other shapes and size configurations are possible within spirit o of the invention.

As shown, the guide rails 230 are secured to the frame assembly 210 about the drive modules 222 using the plurality of guide rail brackets 242.

As shown in FIGS. 9 and 10, each guide rail bracket 242 includes a body 243 having a frame connection section 244, a first guide rail connection section 245, and a second guide rail connection section 246.

As shown, the body 243 is a monolithic member made from a material having high strength, such as aluminum, steel or iron. However, one skilled in the art should appreciate other materials can be used.

According to the invention, the frame connection section 244 is positioned along one end of the body 243. In an exemplary embodiment, the frame connection section 244 is a planar body running transverse to the drive module 222 and the guide rails 230. As shown, the frame connection section 244 includes a support for strength and a plurality of fastener receiving passageways for securing the frame connection section 244 to the frame assembly 210 using fasteners.

According to the invention, the first guide rail connection section 245 and the second guide rail connection section 246 are positioned along another end of the body 243 with respect to the frame connection section 244. The first guide rail connection section 245 and the second guide rail connection section 246 are formed from a block member and separated from each other to provide a drive module receiving section 247 extending there through. The first guide rail connection section 245 and the second guide rail connection section 246 extend on either side of the u-shaped drive module receiving section 247 and include guide rail feet 248 that include a plurality of fastener receiving passageways for securing the first guide rail connection section 245 and the second guide rail connection section 246 to the first guide rail 232 and the second guide rail 236, respectively using fasteners.

Now with reference to FIGS. 11-15, an exemplary embodiment of a transport vehicle 250 according to the invention is shown. The transport vehicle 250 generally includes a pair of shuttles 252 (a leading shuttle 252a and a trailing shuttle 252b spaced apart from the each other).

As shown each shuttle 252 includes an upper body 254, an inner body 256, a pair of first guide rollers 258, a pair of second guide rollers 260, and a carrier assembly 264.

In an exemplary embodiment of the invention, the upper body 254 is a u shaped member having an upper planar surface 254a and a pair of ends 254b extending downward therefrom. The inner body 256 is a monolithic body positioned within a receiving space of the u-shaped body and secured to ends 254b of the upper body 254.

In an exemplary embodiment, as shown, the inner body 256 generally includes a body having magnet receiving space 256a for receiving a magnet 262, a cover 256b covering the magnet 262, and a pair of roller connection members 256c.

Each roller connection member 256c is a finger like member extending outward, from sides of the body to hold a pair of rollers (a pair of first guide rollers 258, a pair of second guide rollers 260). Each roller connection member 256c, on a single side, is offset from a corresponding roller connection member 256c along an axis (L) in the embodiment shown. In the embodiment shown, each roller connection member 256c is s-shaped. However, one skilled in the art should appreciate that other design and shape configurations are possible with in the spirit of the invention.

Figure 14:
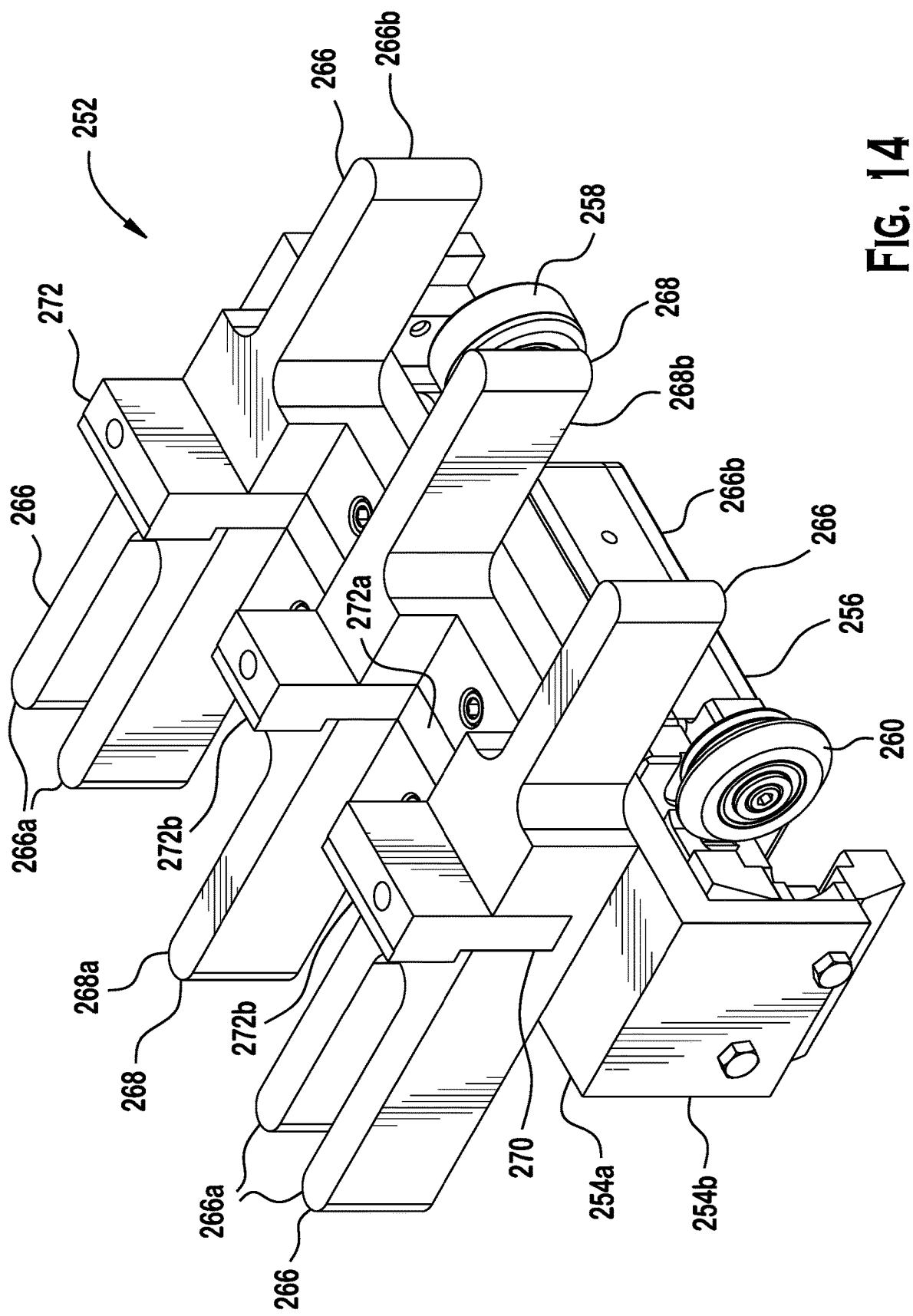
FIG. 14 is a top perspective view of a transport vehicle of a container shuttle assembly according to the invention.
Figure 15:
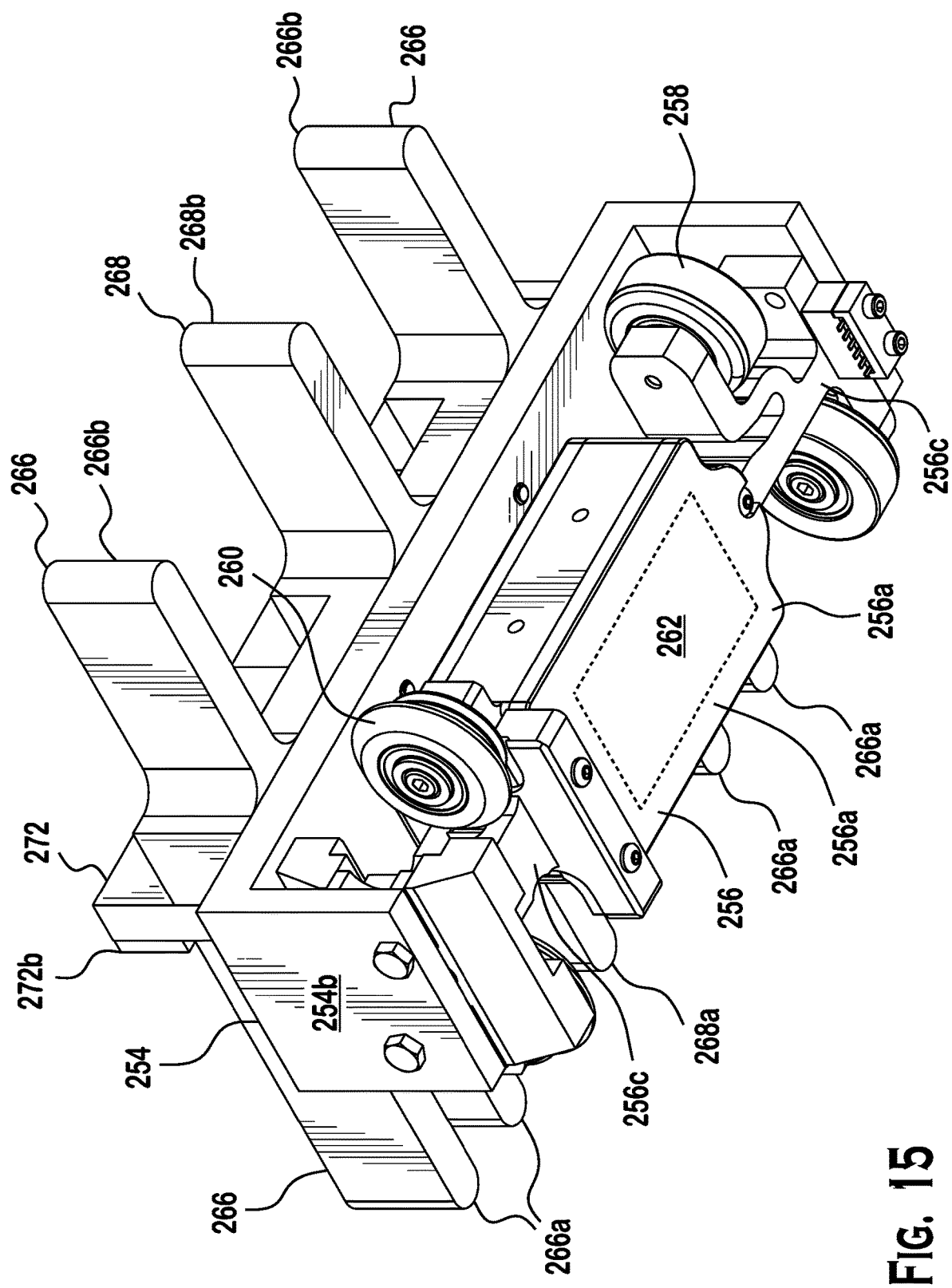
FIG. 15 is a bottom perspective view of the transport vehicle of FIG. 14.

As shown in FIGS. 14 and 15, an exemplary embodiment of a carrier assembly 264 according to the invention is shown. The carrier assembly 264 is positioned on and secured to the upper planar surface 254a of the upper body 254. In an exemplary embodiment, the carrier assembly 264 is a monolithic body with a pair of first carrier sections 266, a second carrier section 268 and a holding block receiving space 270.

In the embodiment shown, each first carrier section 266 generally includes a pair of leading extension members 266a and a trailing extension member 266b extending outward a center thereof. More particularly, the first carrier section 266 is fork shaped with the trailing extension member 266b extending in an opposite direction from the pair of leading extension members 266a. The trailing extension member 266b is a single finger like member extending outward from a center thereof, while the pair of leading extension members 266a are a pair of finger like members extending outward from a center thereof. The pair of leading extension members 266a are u-shaped in the embodiment shown, with a trailing extension member receiving space 266c there between. The trailing extension member receiving space 266c is shaped and sized to correspond with a trailing extension member 266b of an adjacent shuttle 252 (i.e. a leading shuttle 252a or a trailing shuttle 252b)

In the embodiment shown, the second carrier section 268 generally includes a front extension member 268a, a rear extension members 268b extending from a center of the carrier assembly 264 and offset from the front extension member 268a. More particularly, the second carrier section 268 is s-shaped with the front extension member 268a extending in an opposite direction from the rear extension members 268b. The front extension member 268a is a single finger like member extending outward from a center thereof. Likewise, the rear extension member 268b is a finger like member that also extends outward from the center thereof, but in an opposite direction. In an exemplary, the front extension member 268a and the rear extension member 268b run parallel to each other but are offset such that a front extension member 268a of an adjacent shuttle 252 may be positioned adjacent to the rear extension member 268b, when shuttles 252 are stacked next to each other.

As shown, the holding block receiving space 270 is a groove extending through the monolithic body and runs transverse to the first carrier section 266 and the second carrier section 268. The holding block receiving space 270 is sized and shaped to receive and secure the holding block 272.

As further shown in FIGS. 14 and 15, an exemplary holding block 272 is shown and generally includes a support body 272a and plurality of stops 272b. The support body 272a is a plat like member that extends a width of the monolithic body of the carrier assembly 264 and is sized to fit and be secure in the holding block receiving space 270. Each stop 272b is a block like member that extends upward from the support body 272a and the first carrier sections 266 and the second carrier section 268. As shown, each stop 272b is a l-shaped with opposing planar surfaces extending outward from a center thereof and corresponding with the first carrier section 266 or the second carrier section 268. However, one skilled in the art should appreciate that the other shapes and designs are possible in spirit of the invention. While the shown holding block 272 is made of separate pieces, one skilled in the art should appreciate that the holding block 272 could be a monolithic piece formed from a single piece of material, such as metal or a rigid plastic.

As assembled, the carrier assembly 264 is secured to the upper planar surface 254a of the upper body 254, while the inner body 256 is positioned between and secured to the pair of ends 254b of the upper body 254. The pair of first guide rollers 258 are positioned and secured to one side of the inner body 256, and the pair of second guide rollers 260 are positioned on an opposite of the inner body 256 as described above.

Now with reference to FIGS. 6-8, an exemplary unloading assembly 280 for a container shuttle assembly 200 according to the invention is shown. In an exemplary embodiment, the unloading assembly 280 is generally a plate like member positioned above the guideway 220 by a height $H^A$ slightly higher than a height $H^B$ of the transport vehicle 250 sitting on the guideway 220. However, as shown, the holding block 272 may be slightly positioned above unloading assembly 280 so that the holding block 272 can continue pushing the carton C along the unloading assembly 280 until the shuttle 252 arc away from unloading assembly 220 as it continues along the guideway 220. The unloading assembly 280 generally includes a guide surface section 282 positioned on a trailing end there and a pair of leading outer arms 284 and a pair of leading inner arms 286 positioned on a leading end thereof. A plurality of guide support pieces 288 are provided to secure unloading assembly 280 to the frame assembly 210 and the guideway 220

According to the invention, the container shuttle assembly 200 includes a guideway control system G that uses software, hardware, and electrical signals control movement of the transport vehicles 250 and, more particularly, the shuttles 252 by the drive modules 222 about the guideway 220. More particularly, the guideway control system G controls the position of a pair of shuttles 252 (a leading shuttle 252a and a trailing shuttle 252b spaced apart from the each other by a specific distance). This can be performed by software known in the art for linear synchronous motor (LSM) systems, as adapted in accord with the teachings hereof, and, preferably, of the type described in the aforesaid incorporated-by-reference applications.

In an exemplary embodiment, the guideway control system G determines shuttle 252 presence and position by monitoring the position sensing logic (which may be, for example, magneto-electric, optical or otherwise) of the respective block and/or by monitoring vehicle identification logic (e.g., RFID or otherwise), also of the respective block. In some embodiments, position and/or identification information is determined in other ways, alternatively or in addition. Thus, for example, that information can be determined by inference, e.g. based on information supplied from the other data processors (not shown).

With vehicle presence and position determined, the guideway control system G acquires velocity and acceleration set points for the shuttle 252 and then guideway control system G governs powering of the propulsion coils 226 that make up the drive module 222 and, thereby, governs the position, velocity and acceleration of transport vehicles 250 as they pass over that block—and, more specifically, the shuttles 252 over the respective propulsion coils 226 of that drive module 222. To this end, software determines where a shuttle 252 is on the guideway and powers the drive module 222 and propulsion coil 226 to re-position shuttle 252 to a specific position. This is done by receiving and applying control signals to the position sensing logic (sensors), power electronic components, and microprocessors 228 that serve as controllers for the propulsion coils 226. Accordingly, a pair of shuttles 252 travel over the guideway 220 when the propulsion coils 226 is powered and provides a segmented electromagnetism field that interacts with the magnet 262 of the shuttle 252 to propel or stop the shuttle 252. As a result, the distance between the leading shuttle 252a and the trailing shuttle 252b can be managed. In fact, such a system allows for varied distance between the leading shuttle 252a and the trailing shuttle 252b.

Now with reference to FIGS. 1-5 and 16, a product transport assembly 300 according to the invention is shown.

In an exemplary embodiment, the product transport assembly 300 generally includes a robot arm 310 with an end effector 312, a vision device 320, a conveyor belt 330, and a roller track 340.

Figure 16:
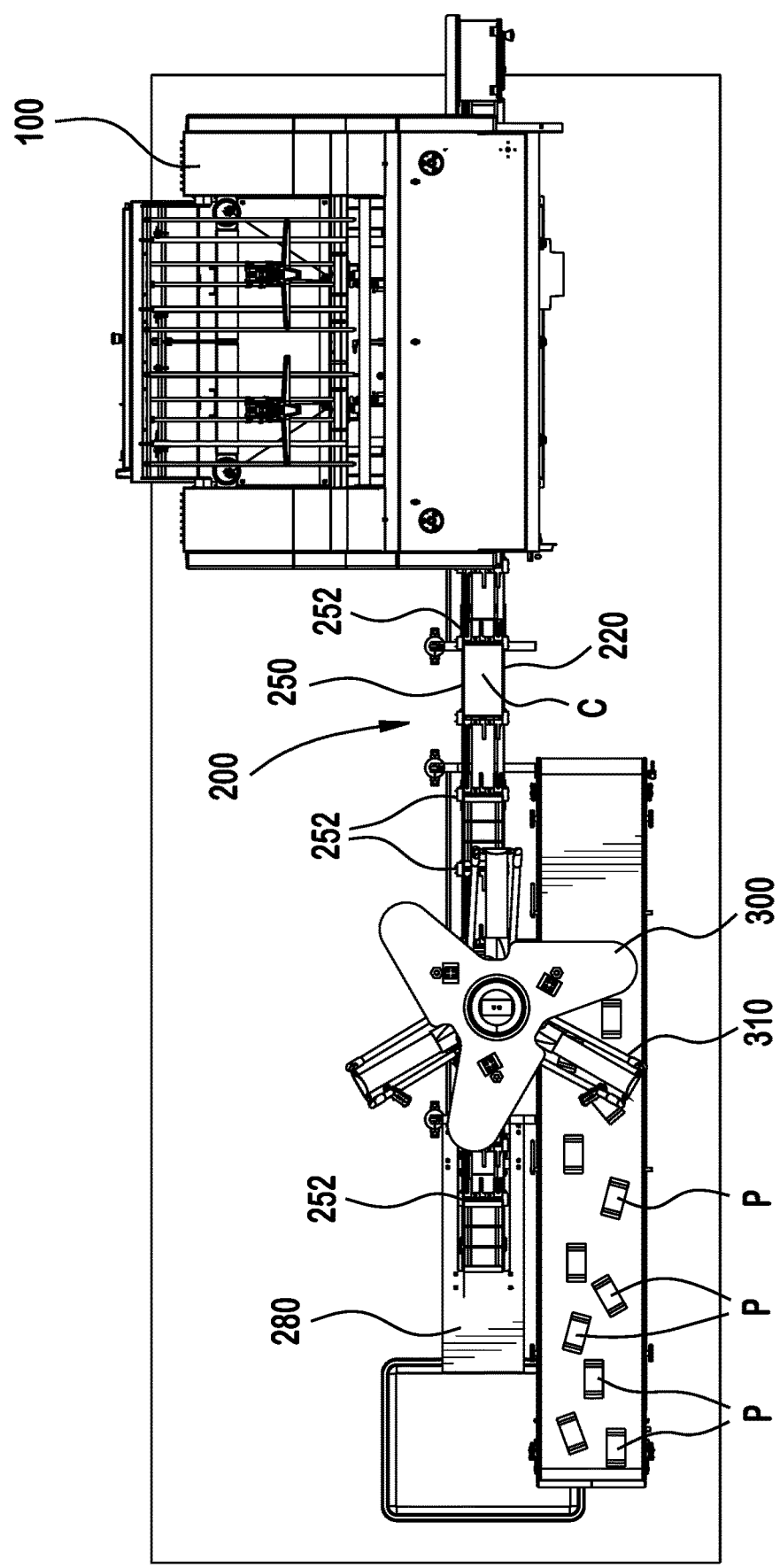
FIG. 16 is a top view of a container shuttle assembly according to the invention showing the major components without protective housing (H) and structural supports (S) thereof.

The conveyor belt 330 extends parallel to the roller track 340 as shown in FIG. 16. The conveyer belt 330 may be any type of powered belt known to those with ordinary skill in the art capable of being driven in a loop and moving an item placed on the belt along a length of the belt. The roller track 340, as shown, includes rollers 342 defining a receiving space for product P; the product P is movable along a length of the roller track 340.

The robot arm 310 and vision device 320, as shown in FIGS. 1-5, are positioned above the parallel conveyer belt 330 and roller track 340. The robot arm 310 is movable along all three axes of a three-dimensional coordinate system. The end effector 312 is fixed to an end of the robot arm 310 and is capable of directly interfacing with the product P. The end effector 312 is used to secure the product P to the robot arm 310 in a fixed orientation; the end effector 312 of the embodiment is not capable of tilting product P. In the shown embodiment, the end effector 312 is a suction. The end effector 312 could alternatively be fingers grasping the product P, pins penetrating the product P, a magnet forming an electromagnetic connection with the product P, a device attaching to the product P by adhesion, or any other type of end effector known to those with ordinary skill in the art.

The robot arm 310 and end effector 312 operate under guidance of the vision device 320, and in the shown embodiment, the vision device 320 is a camera. In other embodiments, the vision device 320 may be a laser displacement sensor or any other type of vision device used in the guidance of robot arms and known to those with ordinary skill in the art.

According to the invention, the container packaging assembly 1 a position management system 400 that communicates with the container forming assembly 100, the container shuttle assembly 200, and the product transport assembly 300. The position management system 400 generally includes known position sensors, signal and power electronics, and integrated software to control the container forming assembly 100, the container shuttle assembly 200, and the product transport assembly 300 in synchronicity. The position management system 400 communicates with the container forming assembly 100, the container shuttle assembly 200, and the product transport assembly 300 so that the container forming assembly 100 prepares the appropriate sized container for product C ready for packaging. The container shuttle assembly 200 is directed to appropriately position shuttles 252 to accommodate the appropriate size container C by adjusting the distance between the shuttles 252 to form a transport vehicle 250. The position management system 400 then can instruct the product transport assembly 300 to positon the appropriate amount of product P in the container C moved by the transport vehicle 250 along the guideway 220. Generally, the product transport assembly 300 is a hub to control the varied components of the container packaging assembly 1.

Now with reference to FIGS. 1-5 and 16, assembly of the container packaging assembly 1 according to the invention will be described. As shown, in an exemplary embodiment of the invention, the container forming assembly 100 is positioned at one end and one side of the container shuttle assembly 200. The product transport assembly 300 is positioned at another end of the container shuttle assembly 200 and positioned on an opposite side with respect to the container forming assembly 100. The positioning management system 400 can be positioned anywhere and is connected to the container forming assembly 100, the container shuttle assembly 200, and the product transport assembly 300 using cables (not shown).

Now with reference to the FIGS. 1-5 and 16, use of the container packaging assembly 1 will be described.

In an exemplary embodiment, the product transport assembly 300 identifies the type of product to be packaged using the vision device 320. The positioning management system 400 then commands the container forming assembly 100 to form specific sized containers based on a programmed setting as well as based on the product to be packages. The container C is formed and the handling mechanism M grabs the container C from the back side of the container forming assembly 100 and transfers the container C to the container shuttle assembly 200. At the same time, the positioning management system 400 commands the guideway control system G to position a pair of shuttles 252 travel over the guideway 220 using the propulsion coils 226 through segmented electromagnetic fields that interacts with the magnet 262 of the shuttle 252 to propel or stop the shuttle 252. As a result, the distance between the leading shuttle 252a and the trailing shuttle 252b can match the container C transferred from the container forming assembly 100. The container C is supported by the carrier assembly 264 and, more particularly corresponding first carrier sections 266 and second carrier sections 268 of the leading shuttle 252a and the trailing shuttle 252b. Further, the container C is held by holding blocks 272 of the leading shuttle 252a and the trailing shuttle 252b.

When positioned, the leading shuttle 252a and the trailing shuttle 252b are positioned to form a transport vehicle 250 for that matches the size of the transported container C from the container forming assembly 100. The leading shuttle 252a and the trailing shuttle 252b are positioned relative to each other, such that they leave a length of space exactly equivalent to the length of a container C. The distance is automatically adjusted based on the programed settings for sized container C formed by the container forming assembly 100. This is referred to as an automatic size change means. This feature will allow the container shuttle assembly 200 and, more particularly, the distance between the leading shuttle 252a and the trailing shuttle 252b to match the container C size once that size is set by the positioning management system 400. The automatic size change means eliminates changeover time, and can also enable other functions such as multiple concurrent sizes (described as follows).

Further, the distance between containers C on the container shuttle assembly 200 is referred to as the "pitch". In addition to the automatic size change functionality of the shuttles 252, the control over the independent shuttles 252 allows the container shuttle assembly 200 to automatically set the distance between each container along the guideway 220. The distance can be dynamically set to varying distances or all set the same, however the application is best serviced, and can be varied throughout the system as well. This feature is referred to as "variable pitch". This variable pitch means enables the process of moving containers C along the guideway 220 to be more efficient compared to a "fixed pitch" system. For a fixed pitch system the pitch would need to be large enough to fit the varying sized containers that cannot change. In this scenario the smaller containers C would be on the same pitch but have a large distance between them and therefore a less efficient process.

The container shuttle assembly 200 also has the capability of running different size containers C concurrently. As such, the positioning management system 400 commands the container forming assembly 100 to form varying sized containers C in a programmed sequential order. As the containers C are transported to the guideway 220, the container shuttle assembly 200 uses the auto-size adjustment means and the variable pitch means to adjust the shuttles 252 to position the leading shuttle 252a and the trailing shuttle 252b to adjust a distance there between to match the length of the transported container C. Additionally, the container shuttle assembly 200 adjusts the distance between the transport vehicles 250.

As the container C moves down the guideway 220 by the transport vehicle 250, the positioning management system 400 provides commands product transport assembly 300 to identify the product P coming down the conveyor belt 330 using the vision device 320, and have the robot arm 310 place the appropriate amount of product P in the container C.

Expanding on the multiple concurrent sizes capability of the container shuttle assembly 200, the container packaging assembly 1 provides inspection of the incoming product to be loaded into the containers C and, based on this information, request, on demand, the positioning management system 400 manages the appropriate container for this particular product or quantity of flow.

After the container C is loaded, the transport vehicle 250 moves the container C to the unloading assembly 280. The transport vehicle 250 travels under the unloading assembly 280 the pair of leading outer arms 284 support the container C, which further advances over the pair of leading inner arms 286, and transfer the across the guide surface section 282 for further packaging (i.e. sealing) and shipping.

The foregoing illustrates some of the possibilities for practicing the invention. Many other embodiments are possible within the scope and spirit of the invention. It is, therefore, intended that the foregoing description be regarded as illustrative rather than limiting, and that the scope of the invention is given by the appended claims together with their full range of equivalents.

What is claimed is:

1. An adaptive container packaging assembly comprising a container forming assembly, a container shuttle assembly, and a product transport assembly;

the container forming assembly providing a plurality of varying sized containers;

the product transport assembly positioned adjacent the container shuttle assembly and having a robot arm to position product in the plurality of varying sized containers; and the container shuttle assembly positioned adjacent to the container forming assembly and having:
- a linear synchronous motor guideway shaped in an endless loop;
- a plurality of transport vehicles movable along the guideway, each transport vehicle having a plurality of shuttles spaced apart to accommodate and receive the plurality of varying sized containers, each shuttle of the plurality of shuttles including an upper body secured to a pair of first guide rollers and a pair of second guide rollers, and a carrier assembly secured to an upper planar surface of the upper body, the carrier assembly including a pair of first carrier sections positioned parallel to each other, and a second carrier section positioned between the pair of first carrier sections and extending parallel thereto; and a holding block extending across a width of the carrier assembly and transverse to the pair of first carrier sections, with each first carrier section of the pair of first carrier sections including a pair of leading extension members and a trailing extension member extending outward from a center thereof.

2. The adaptive container packaging assembly of claim 1, wherein the container forming assembly is an apparatus for forming paperboard containers from flat blanks.

3. The adaptive container packaging assembly of claim 1, wherein the container shuttle assembly includes a frame assembly supporting the guideway and an unloading assembly positioned above the guideway.

4. The adaptive container packaging assembly of claim 3, wherein the guideway includes a plurality of drive modules, each drive module is a long-stator linear motor section and includes a housing enclosing a plurality of propulsion coils and a guide surface positioned on a top thereof.

5. The adaptive container packaging assembly of claim 4, wherein each drive module is positioned in and secured to the frame assembly in an oval shaped arrangement to form the endless loop.

6. The adaptive container packaging assembly of claim 5, wherein the guideway further includes a plurality of guide rails positioned adjacent to the plurality of drive modules.

7. The adaptive container packaging assembly of claim 6, wherein the plurality of guide rails are secured to outer surfaces of each drive module of the plurality of drive modules.

8. The adaptive container packaging assembly of claim 7, wherein each guide rail is an elongated member extending along and secured to the outer surfaces of each drive module of the plurality of drive modules.

9. The adaptive container packaging assembly of claim 8, wherein the plurality of guide rails include a first guide rail positioned on one side of each drive module of the plurality of drive modules, and a second guide rail positioned on an opposite side of each drive module of the plurality of drive modules, the plurality of guide rails positioned such that a top surface of the guide rails is substantially planar with the guide surfaces of the plurality of drive modules.

10. The adaptive container packaging assembly of claim 9, wherein the first guide rail includes the planar top surface positioned substantially planar with the guide surfaces of the plurality of drive modules.

11. The adaptive container packaging assembly of claim 10, wherein the second guide rail includes a pair grooves positioned on a top surface of the second guide rail and are positioned substantially planar with the guide surfaces of the plurality of drive modules.

12. The adaptive container packaging assembly of claim 1, wherein each first carrier section of the pair of first carrier sections is fork shaped with the trailing extension member extending in an opposite direction from the pair of leading extension members.

13. The adaptive container packaging assembly of claim 12, wherein the trailing extension member is a single finger member extending outward from the center of the first carrier section.

14. The adaptive container packaging assembly of claim 13, wherein the pair of leading extension members are a pair of finger members extending outward and having u-shape with a trailing extension member receiving space positioned there between.

15. The adaptive container packaging assembly of claim 14, wherein the second carrier section includes a front extension member and a rear extension member extending in opposite directions from a center thereof.

16. The adaptive container packaging assembly of claim 15, wherein the front extension member and the rear extension member are offset from each other.

17. The adaptive container packaging assembly of claim 1, wherein the container shuttle assembly includes an unloading assembly positioned above the guideway by a height higher than a height of a transport vehicle, of the plurality of transport vehicles, sitting on the guideway.

* * * * *